United States Patent [19]

Karper

[11] E Re. 28,927

[45] Reissued Aug. 10, 1976

[54] ROTARY CARD FILE

[76] Inventor: Albert Karper, 5700 Collins Ave., Miami Beach, Fla. 33140

[22] Filed: Apr. 4, 1975

[21] Appl. No.: 565,322

Related U.S. Patent Documents

Reissue of:

[64] Patent No.: 3,734,587
Issued: May 22, 1973
Appl. No.: 211,420
Filed: Dec. 23, 1971

[52] U.S. Cl. ..... 312/186; 312/126; 312/189; 211/126

[51] Int. Cl.[2] ..... A47B 63/00; A47F 3/14

[58] Field of Search ..... 312/185, 186, 189, 126, 312/333; 211/126

[56] References Cited

UNITED STATES PATENTS

| | | | |
|---|---|---|---|
| 498,283 | 5/1893 | Miller | 312/189 |
| 2,172,444 | 9/1939 | Larson et al. | 312/185 |
| 2,389,923 | 11/1945 | Miller | 312/189 |
| 2,424,144 | 7/1947 | Bruen | 312/189 |
| 2,441,717 | 5/1948 | Nero | 312/189 |
| 2,517,678 | 8/1950 | Knittel | 312/186 |
| 2,541,890 | 2/1951 | Schaperkotter et al. | 312/333 |
| 2,628,618 | 2/1953 | Karper | 312/189 |
| 2,703,744 | 3/1955 | Karper | 312/189 |
| 3,231,096 | 1/1966 | Dulski | 312/186 |
| 3,602,563 | 8/1971 | Karper | 312/189 |

*Primary Examiner*—Paul R. Gilliam
*Assistant Examiner*—V. Sakran

[57] ABSTRACT

A rotary card file in which a card holder supported for rotation by a base structure has a plurality of trays that extend from a central hub and are equipped with retainer tracks that keep the cards in file alignment when the card holder is turned to position the tray in an upwardly facing access position, and which support the cards suspended from the tray when the card holder is turned to position the tray in a downwardly facing storage position [ . ] *; and which in one embodiment of the invention, that shown in FIG. 9, has means for removably holding the trays against radially outward movement from the rotary card holder during traverse of the trays along the lower part of their circular orbit.*

10 Claims, 19 Drawing Figures

FIG. 6.
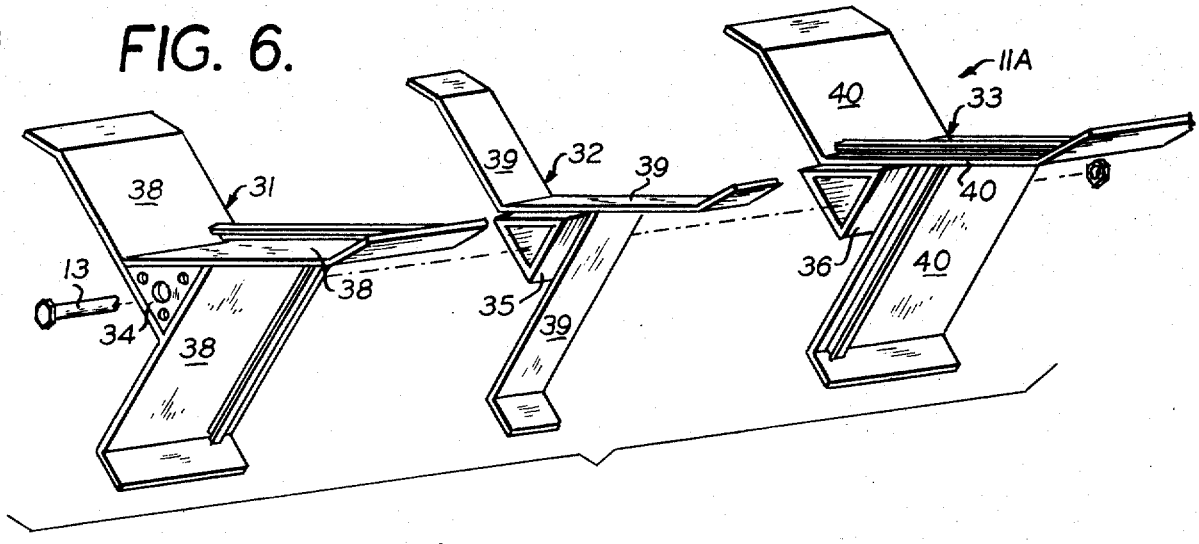
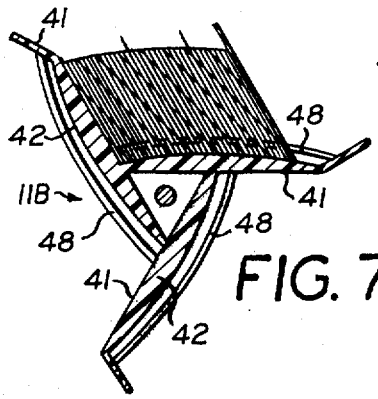
FIG. 7.
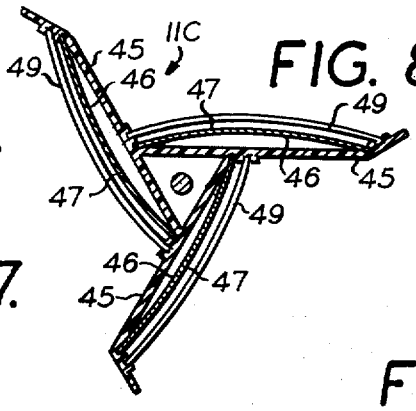
FIG. 8.
FIG. 9.
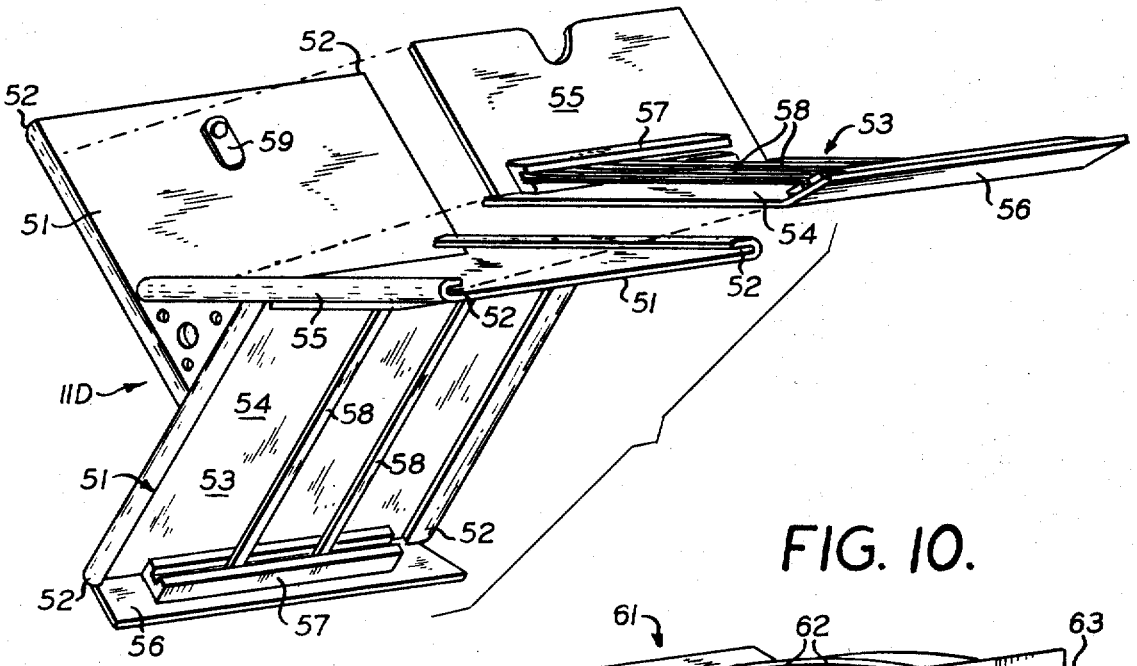
FIG. 10.
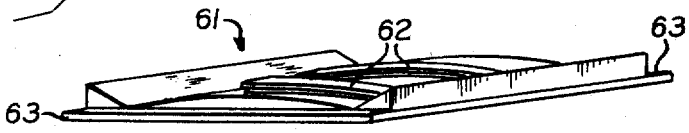

ROTARY CARD FILE

Matter enclosed in heavy brackets [ ] appears in the original patent but forms no part of this reissue specification; matter printed in italics indicates the additions made by reissue.

BACKGROUND AND SUMMARY OF THE INVENTION

This invention relates in general to card files and more particularly to *a* card file having a card holder that is supported by rotation by a base structure.

In the prior art there are a variety of card file configurations, such as are disclosed by my U.S. Pat. No. 3,253,871 and No. 3,602,563, and the well known rotary file in which the cards are secured to a rotatable drum by circumferential tracks provided thereon. Some of the disadvantages of the drum type rotary card file are that the number of cards that can be filed is limited by the circumferential length of the drum and that the space occupied by the drum cannot be used for card storage.

The invention provides a rotary card file in which the card holder [ has one or more trays ] *is a rotor with one or more arms* for carrying cards in file. This allows more cards to be stacked within a given overall space envelope than was possible with a drum type card holder.

According to a preferred embodiment of the invention, the rotatable card holder has three [ trays ] *arms* that extend symmetrically from a central hub. Each [ tray ] *arm* is equipped with retainer tracks that keep the cards in file alignment when the card holder is turned to position the [ tray ] *arm* in an upwardly facing access position. The retainer tracks also support the cards suspended from the [ tray ] *arm* when the card holder is turned to position the [ tray ] *arm* in a downwardly facing storage position.

The invention further provides a card holder in which the [ trays ] *arms* thereof are adapted to receive removable [ inserts ] *trays* that hold pre-filed cards. This makes it possible to quickly exchange different separately storable sets of cards without individual handling or disturbing the filing order.

For a better understanding of the invention and its various advantages, reference should be had to the accompanying [ drawing ] *drawings* and following detailed description which exemplify preferred embodiments of the invention.

BRIEF DESCRIPTION OF THE [ DRAWING ] *DRAWINGS*

In the [ drawing ] *drawings:*

FIG. 6 is an exploded view of an expandible card holder that can be used in the card file of the invention.

FIG. 7 is a transverse sectional view of a card holder having [ trays ] *arms* with integrally formed curved bases that provide increased card capacity.

FIG. 8 is a transverse sectional view of a card holder similar to that shown in FIG. 7, but having [ trays ] *arms* attached separate curved bases.

FIG. 9 is an exploded *perspective* view of another type of card holder in which the [ trays ] *arms* are adapted to receive removable [ inserts ] *trays* for holding pre-filed cards.

FIG. 10 is a perspective view of a card tray [ insert ] which can be used in the card holder of FIG. 9.

DESCRIPTION OF PREFERRED EMBODIMENTS OF THE INVENTION

Figure 1:
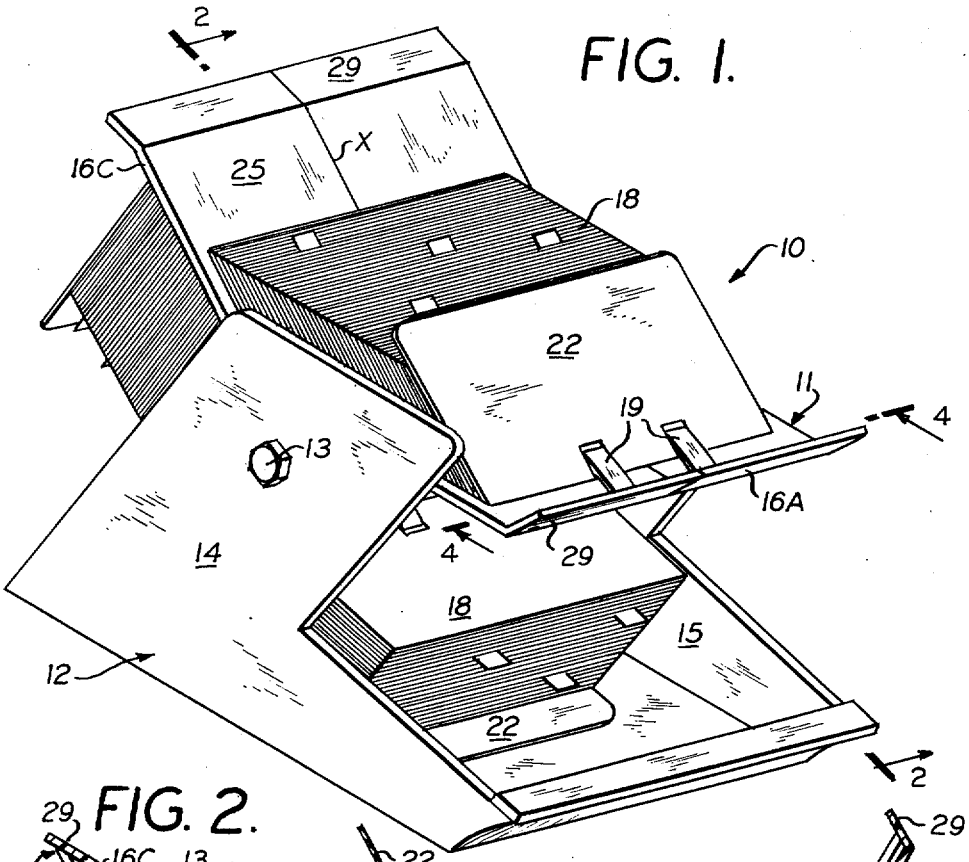
FIG. 1 is a perspective view of a rotary card file according to a preferred embodiment of the invention.

In FIGS. 1–4 there is exemplified a rotary card file 10 in which a card holder 11 is supported by a base structure 12 for rotation relative thereto about a fixed axis defined by the centerline of a shaft 13 received by opposite sides 14 and 15 of base 12.

Card holder 11 has three [ trays ] *arms* 16A, 16B, 16C which are connected to corresponding sides of a triangular central hub 17 and extend therefrom in equally spaced relation thereabout.

The [ trays ] *arms* 16A, 16B, 16C serve for carrying cards 18 in file order, and for such purpose there is provided for each [ tray ] *arm* 16A, 16B, 16C retainer means supported thereby. In the particular embodiment of the invention represented by FIGS. 1–4, such retainer means are tracks 19 that are integrally connected to the [ tray ] *arm* 16A, 16B, 16C and extend in planes generally perpendicular to the card holder 11 rotation axis. The cross section of each track 19 is, as can be best seen in FIG. 4, chosen so that it can be slipped into similar T-shaped slots provided in the cards 18. Preferably two tracks 19, arranged parallel, are provided for each [ tray ] *arm* 16A, 16B, 16C.

Figure 2:
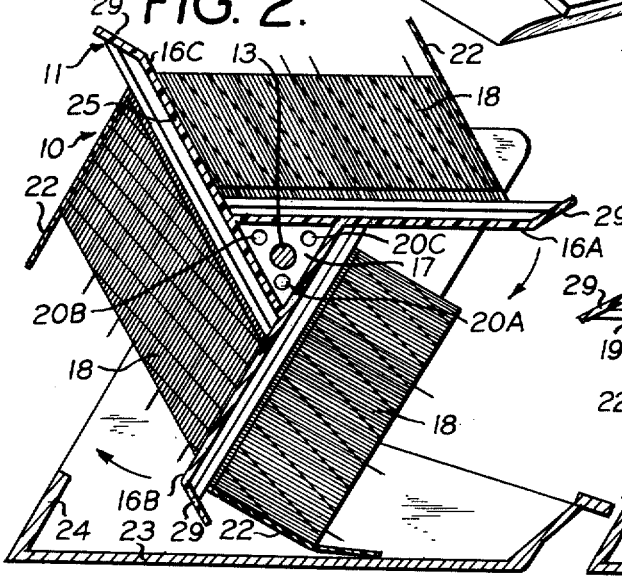
FIG. 2 is a sectional elevation view of the card file shown in FIG. 1 as taken along line 2—2 therein.

Tracks 19 retain the cards 18 in alignment when the card holder 11 is turned to position a selected [ tray ] *arm* 16A–C in an upwardly facing position, and to support the cards 18 suspended from the [ tray ] *arm* 16A–C when the card holder 11 is turned to position the [ tray ] *arm* 16A–C in a downwardly facing position. As can be seen in FIGS. 1 and 2, the [ tray ] *arm* 16A is facing upwardly so as to present the cards 18 carried thereby for access, whereas the [ trays ] *arms* 16B and 16C are facing downwardly and the cards 18 which they carry are suspended from their associated tracks 19.

Figure 3:
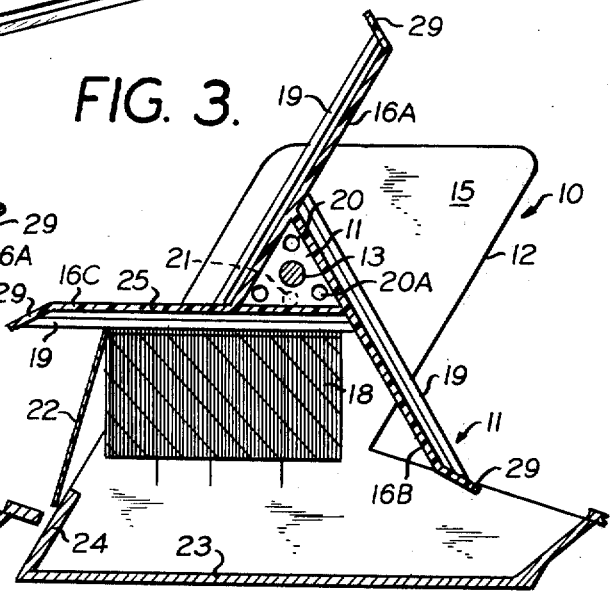
FIG. 3 is a sectional view of the card file similar to FIG. 2, but with the card holder rotated 60° and some of the cards removed to show details thereof.
Figure 4:
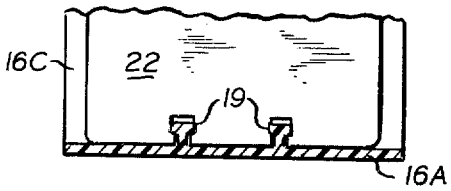
FIG. 4 is a sectional view of the card file shown in FIG. 1 as taken along line 4—4 therein, and illustrating in detail the cross-sectional configuration of one type of tracks used for retaining the cards.

In the operation of card file 10, the holder 11 is turned manually such that one [ tray ] *arm* 16A–C at a time is in the access position. To avoid unintentional turning of holder 11, there is provided detent latch means that is operable to secure holder 11 in any one of three angular index positions each corresponding to a particular [ tray ] *arm* 16A–C in access position. While any conventional latch means can be employed for this purpose, the invention provides three recessed sockets 20A–C in the end of hub 17 and a spring-loaded ball piece 21 on the inside face of the base side 14. The end of piece 21 engages into one of the sockets 20A–C at a time to secure the corresponding [ tray ] *arm* 16A–C in access position, as for example, in FIG. 2 piece 21 is in socket 20A to secure [ tray ] *arm* 16A for access. In FIG. 3, the holder 11 is turned to an intermediate position, as when shifting [ tray ] *arm* 16C into access position, and, of course, the piece 21 (shown in phantom) rides against hub 17.

For each [ tray ] *arm* 16A–C there is provided a card protector 22, made of heavy sheet plastic, cardboard, or the like. Protector 22 is expediently received by tracks 19 so as to be supported by the [ tray ] *arm* 16A–C for movement therewith, and is disposed to extend beyond the height of the cards 18 carried by the [ tray ] *arm* 16A–C so as to protect the cards 18 from contact with the bottom 23 and back ledge 24 of base 12 when holder 11 is turned.

Protector 22 is arranged so as to catch against ledge 24, as shown in FIG. 3, and thereby prevent holder 11 from being turned counterclockwise, or backwards more than a small fraction of a turn, and yet not interfere with turning holder 11 forward or clockwise. From FIG. 2 it can be noted that protector 22 is designed for wiping contact engagement with the base bottom 23 such that the cards 18 in [ tray ] *arm* 16B are supported by protector 22 in stacked relation for compact storage when holder 11 is turned to position [ tray ] *arm* 16B facing downwardly.

Another advantageous feature of the invention is that the back of each [ tray ] *arm* 16A–C projects beyond the inner edge of the next succeeding surface for the cards carried thereby. In FIGS. 1 and 2 this can be noted and the last card 18 in the stack thereof lies against the back 25 of [ tray ] *arm* 16C so that the entire stack of cards 18 on tray 16A is supported for convenient access and examination.

Figure 5:
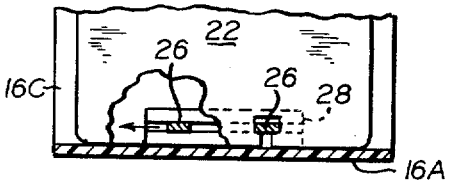
FIG. 5 is a sectional view similar to FIG. 4, which illustrates another type of tracks that can be used in the invention for retaining the cards.

FIG. 5 illustrates that the card retainer tracks need not be integral with the [ trays ] *arms*, but can be as the tracks 26, each releasably connected to the associated [ tray ] *arm* 16A–C as by insertion at one end into a slotted channel 28 attached to the back of the preceding [ tray ] *arm*, and insertion at the opposite end into a similar channel (not shown) attached to the inside of [ a tray ] *an arm* ledge similar to the ledges 29 shown in FIGS. 1–3.

FIG. 6 shows a card holder 11A construction that can be employed in the file 10 to accommodate different widths of cards 18. Holder 11A has a plurality of tandem joined sections 31, 32, 33 each having a respective hub piece 34, 35, 36 to which are connected [ tray ] *arm* sections 38, 39, 40.

If desired, the card holder 11 shown in FIG. 1 could be made of two sections 31 and 33 joined together such as to abut along a line X. To hold wider cards 18, the smaller middle section 32 would merely be installed upon the shaft 13 between the two end sections 31 and 33.

In FIG. 7 there is shown a card holder 11B in which the [ trays ] *arms* 41 have integrally joined curved base surfaces 42 that provide greater card stacking length than a flat surface in a [ tray ] *arm* 41 of the same size.

FIG. 8 shows another type card holder 11C in which the trays 45 are adapted to receive separate attachable inserts 46 which have curved base surfaces 47 to provide increased card capacity.

The [ trays ] *arms* 41 and 45 can have respective card retainer tracks 48 and 49 that are either integrally connected to the [ trays ] *arms* 41, 45 or are releasably connected thereto.

[ FIG. 9 shows a card holder 11D in which the trays 51 have grooves 52 ] *In FIG. 9 the card holder 11D is in the form of a rotor having an axis of rotation and arms 51 projecting substantially radially from a hub. Each arm has grooves 52 formed at its side edges and* extending in planes generally perpendicular to the rotation axis of [ holder 11D and which are disposed to ] *the rotor to slidably* receive a typical removable [ insert ] *tray* 53 that is adapted to hold a quantity of cards in pre-filed order. [ Insert ] *Each tray* 53 has a bottom 54 and inclined end pieces 55 and 56 to which are attached channels 57. Channels 57 receive removable card retainer tracks 58. On the back of each [ tray ] *arm* 51 there is provided a swing catch 59 for securing the [ insert ] *tray* 53 at its end piece 55 *against detachment from its respective arm as it traverses the lower portion of its orbit upon rotation of the rotor.*

FIG. 10 shows a card tray [ insert ] 61 that can be substituted for the [ insert ] *tray* 53. [ in card holder 11D Insert ] *Tray* 61 is expediently molded of plastic and has integrally joined retainer tracks 62, and flanges 63 that fit into grooves 52.

Figure 11:
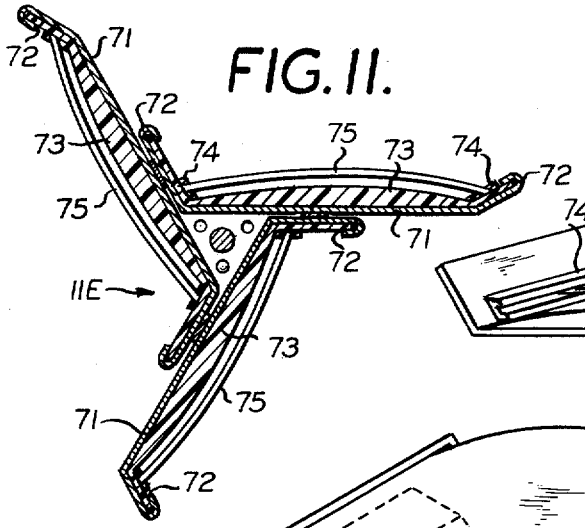
FIG. 11 is a transverse sectional view of a card holder in which the [ trays ] *arms* are adapted to receive removable [ inserts ] *trays* that are slidable into guides open at the sides of the [ trays ] *arms*.
Figure 12:
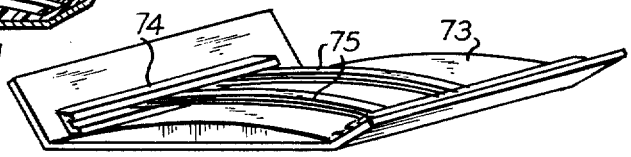
FIG. 12 is a perspective view of a card tray [ insert ] which can be used in the card holder of FIG. 11.

FIG. 11 shows a card holder 11E in which the [ trays ] *arms* 71 have grooves 72 extending parallel to the rotation axis of holder 11E and which are disposed to receive a typical removable [ insert ] *tray* 73 of the style shown in FIG. 12. [ Insert ] *Tray* 73 has attached channels 74 that receive removable, slide-in, card retainer tracks 75.

Figure 13:
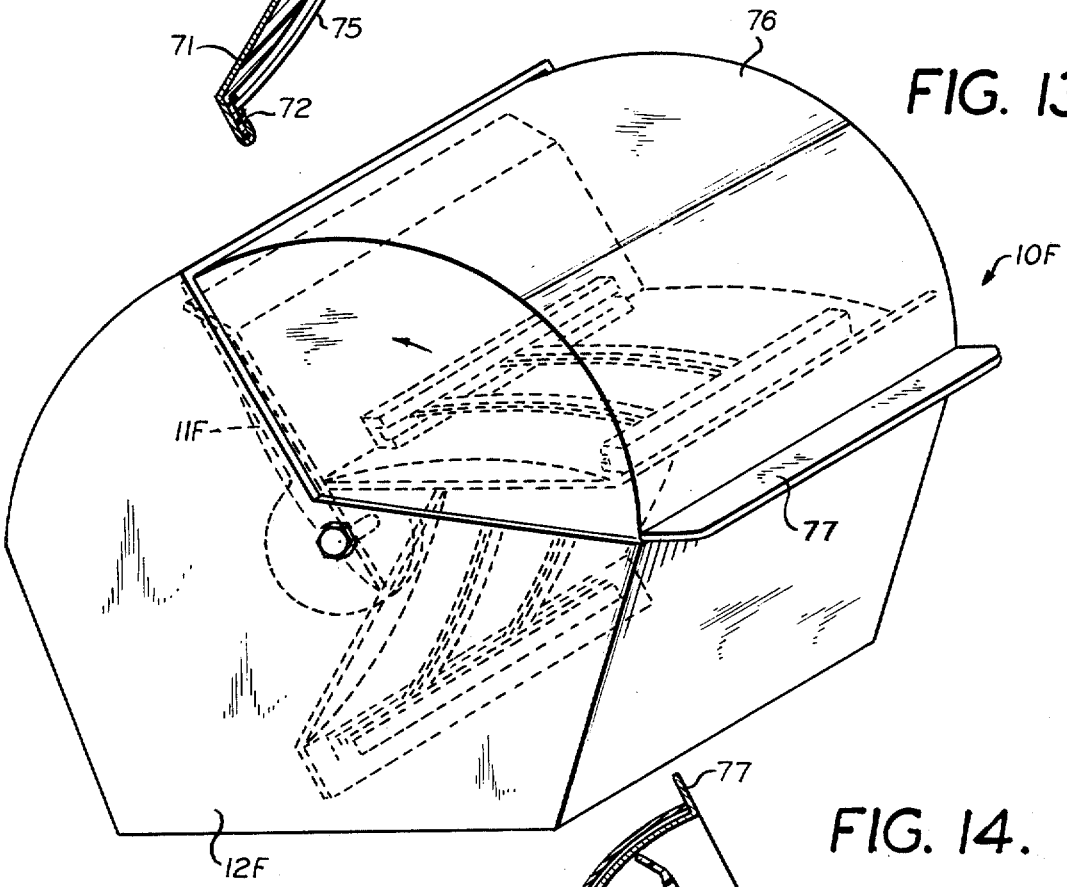
FIG. 13 is a perspective view of a rotary card file according to another embodiment of the invention in which there is provided a closure for covering the card holder.
Figure 14:
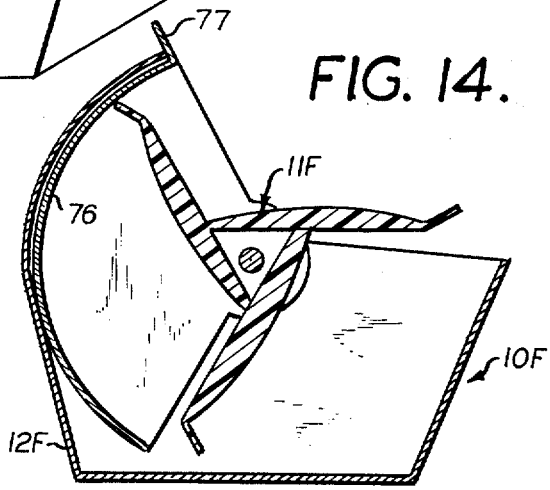
FIG. 14 is an elevation section view of the rotary card file shown in FIG. 13 as seen with the closure in its open position.

FIGS. 13 and 14 exemplify a rotary card file 10F in which the card holder 11F is supported by a closable type base 12F that is equipped with a closure 76 supported by base 12F for movement relative thereto from the open position shown in FIG. 14, in which card holder 11F is exposed for access, to a closed position, as shown in FIG. 13, in which holder 11F is enclosed. For convenience in opening and closing the closure 76 is equipped with a lip 77 that cooperates with base 12F to limit the movement of closure 76 at its extreme positions.

Figure 15:
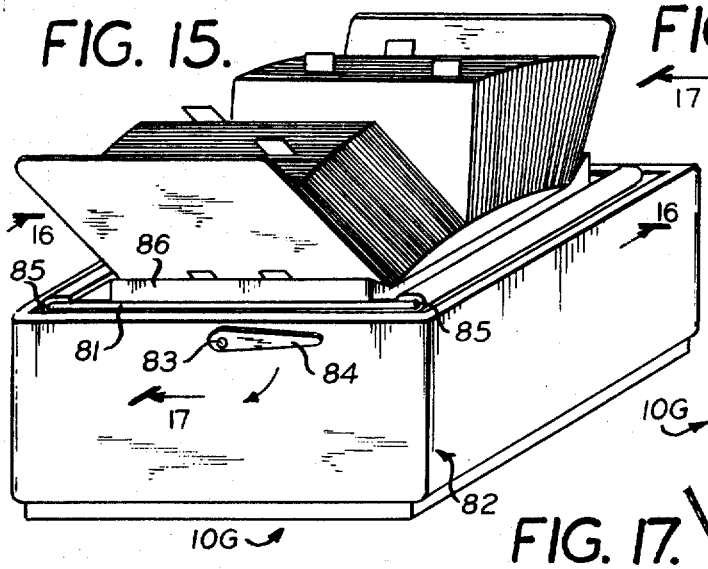
FIG. 15 is a perspective view of a rotary card file according to a further embodiment of the invention.
Figure 16:
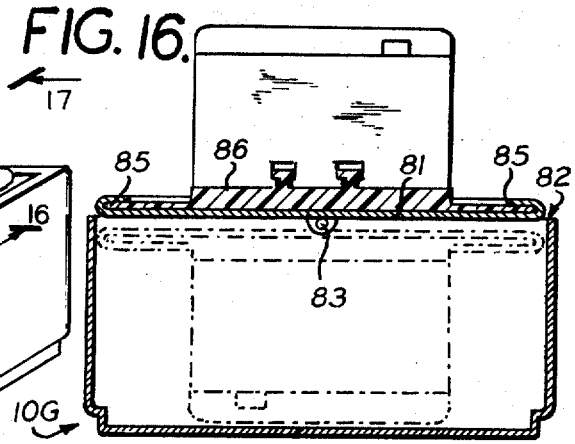
FIG. 16 is a sectional view of the rotary card file shown in FIG. 15 as taken along line 16—16 therein.
Figure 17:
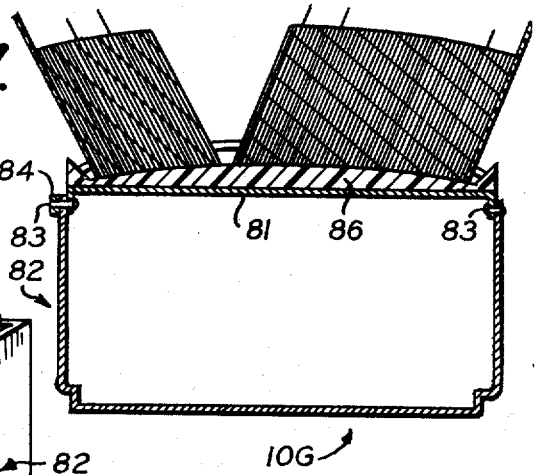
FIG. 17 is a sectional view of the rotary card file shown in FIG. 15 as taken along line 17—17 therein.

FIGS. 15, 16 and 17 exemplify another type of rotary card file 10G contemplated by the invention. Card file 10G has a single [ tray ] *rectangular card carrier* 81 that is supported at opposite ends by a box-like base 82 and is rotatable relative to base 82 about a central axis defined by projecting trunnions 83. The trunnions 83 are [ received through ] *journaled in the end walls of* base 82 and at least one trunnion 83 [ is connected to ] *has* a handle 84 *connected to it* which aids in turning [ tray ] *the card carrier* 81 either to its upwardly facing position, shown in FIGS. 15–17, or to its downwardly facing position as shown in phantom in FIG. 16. [ Tray ] *Carrier* 81 is equipped with grooves 85 that are disposed to receive a card [ holder insert ] *tray* such as that shown in FIG. 19 and designated by 86.

Figure 18:
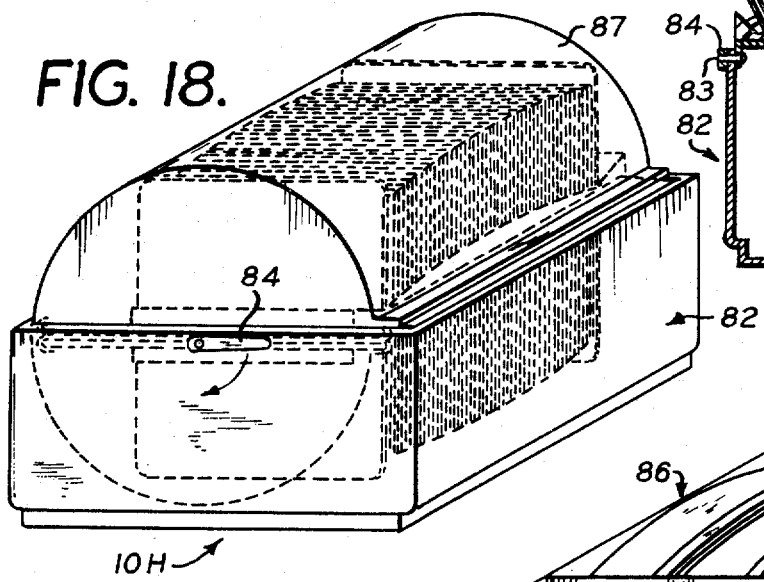
FIG. 18 is a perspective view of a rotary card file according to another embodiment of the invention.
Figure 19:
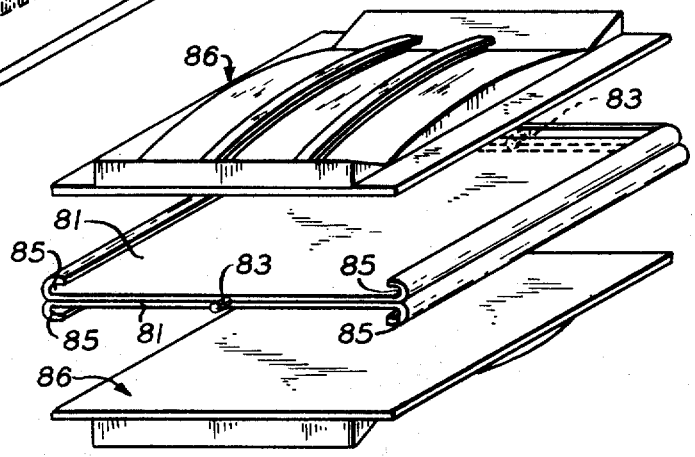
FIG. 19 is an exploded view of the card holder used in the rotary card file shown in FIG. 18.

The rotary card file 10H shown by FIGS. 18 and 19 is basically similar to that shown by FIGS. 15–17, and uses the same type of base 82, and [ trays ] *carriers* 81, except that in the card file 10H there are two card [ holder trays ] *carriers* 81 connected together back-to-back. [ Trays ] *Carriers* 81 in card file 10H are supported at opposite ends by trunnions 83, just as in card file 10G. Each [ tray ] *carrier* 81 receives a card [ holder insert ] *tray* 86.

Handle 84 is turned to bring either one of the trays [ 81 ] *86* to an upward facing position for access to the cards 18 [ thereof as desired ] *held thereby*. A removable cover 87 is expediently provided for the card file 10H.

*In all embodiments of the invention illustrated and described herein, the rotatable card holder — whether it has the cards individually attached thereto, as in FIGS. 1–8, or by means of removable trays, as in FIGS. 9–12 — for convenience can be referred to as a rotor which, in all cases except as specifically shown in FIGS. 15–18, has a horizontally oriented axle with arms radiating therefrom to travel in a circular orbit as the rotor is turned to bring the different packs of cards to the access position.*

It should be appreciated by the artisan that in the several embodiments of the invention herein described, different styles of card retainer tracks can be interchanged as desired, as can be done with the [ trays ] *arms* and card holder [ inserts ] *trays*. In any case, the length of channels used to support the ends of retainer tracks can be varied so that the spacing between tracks can be adjusted to accommodate different size cards.

What is claimed is:

1. A rotary card file which comprises a base means, a card holder supported by said base means for rotation relative thereto about a given axis, and including a plurality of card holding [ trays extending in generally parallel relation ] *arms disposed generally radially* to said axis, retainer means on each tray disposed to retain the cards in alignment when the [ tray ] *arm* is in an upwardly facing position, and to support the cards suspended from the [ tray ] *arm* when same is in a downwardly facing position, and a card protector carried by each [ tray ] *arm* and disposed to extend beyond the cards carried thereby, and to engage the base means to compress the cards [ of the tray ] *on the arm* into a compacted stacked relation when the [ tray ] *arm* is turned to a downwardly facing position.

2. A rotary card file according to claim 1 wherein said card holder includes a polygonal hub rotatable about said axis, and said [ trays ] *arms* are connected each to a corresponding side of said hub for extension therefrom.

3. A rotary card file according to claim 1 wherein at least one [ tray ] *arm* is disposed to receive a removable [ insert disposed ] *tray adapted* to hold a quantity of cards in file order, and wherein said retainer means is connected to said [ insert ] *tray* and removable therewith.

4. A rotary card file according to claim 1 wherein said card holder includes a plurality of axial length sections coupled together along the direction of said axis to accommodate holding of cards having a width greater than the length of any one axial length section.

5. A rotary card file according to claim 1 wherein said card holder includes a pair of [ trays ] *arms* connected together back-to-back and supported at opposite ends by said base means for rotation relative thereto about said axis.

*6. A card file wherein the cards are carried by a rotor mounted in a base for rotation about a horizontal axis, characterized by:*

*A. the rotor having a plurality of tray-carrying arms that project substantially radially from the rotor axis so that upon rotation of the rotor they project downwardly as they traverse the lower part of their orbit;*

*B. a plurality of trays, one for each arm, having means thereon to hold a pack of file cards;*

*C. cooperating means on the arms and the trays freely slidably and detachably connecting the trays with their respective arms, said cooperating means constraining the trays to movement along the arms towards and from the rotor axis; and*

*D. cooperating means operative to preclude any substantial radially outward movement of the trays with respect to the rotor arms on which they are positioned during rotational travel of the arms and the trays thereon along the lower part of their circular orbit.*

*7. The card file of claim 6, wherein said cooperating means includes*

*latch means interlocking each tray with the rotor.*

*8. The card file of claim 7, wherein said arms and trays thereon have overlying wall portions,*

*and wherein said latch means comprises a movable catch on one of said wall portions releasably engageable with a surface on the other wall portion.*

*9. The card file of claim 6, wherein each tray has a bottom wall and a rear end wall rising from the bottom wall to support the pack of file cards in a readily accessible fashion when the rotor arm on which the tray is mounted is in a horizontal access position.*

*10. The card file of claim 9, wherein the rear end wall of a tray in position on an arm of the rotor overlies the adjacent rotor arm so that there are overlying walls on the rotor and on the tray,*

*and wherein said cooperating means by which any substantial radially outward movement of the trays is precluded comprises a movable catch on one of said overlying walls releasably engageable with a portion of the other of said overlying walls.*

* * * * *